United States Patent
Park

(10) Patent No.: US 6,287,234 B1
(45) Date of Patent: Sep. 11, 2001

(54) GEARTRAIN FOR AN AUTOMATIC TRANSMISSION

(75) Inventor: Jong-Sool Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/466,173

(22) Filed: Dec. 17, 1999

(30) Foreign Application Priority Data

Jul. 8, 1999 (KR) .................................................. 99-27506

(51) Int. Cl.[7] ................................ F16H 3/66; F16H 3/62
(52) U.S. Cl. .......................................... 475/286; 475/325
(58) Field of Search ................................... 475/275, 295, 475/323, 325, 286

(56) References Cited

U.S. PATENT DOCUMENTS

| | | | |
|---|---|---|---|
| 3,820,418 | * 6/1974 | Ott | 475/280 |
| 5,098,357 | * 3/1992 | Asada et al. | 475/278 |
| 5,533,945 | * 7/1996 | Martin et al. | 475/276 |
| 5,772,552 | * 6/1998 | Ibaraki et al. | 475/281 |

FOREIGN PATENT DOCUMENTS 8-261301 * 10/1996 (JP) .

* cited by examiner

Primary Examiner—Rodney H. Bonck
Assistant Examiner—Ankur Parekh
(74) Attorney, Agent, or Firm—Finnegan, Henderson, Farabow, Garrett & Dunner, L.L.P.

(57) ABSTRACT

A geartrain for an automatic transmission includes a first single planetary gearset having a first element being variably connected to an input shaft, a second element transferring power to a transfer shaft, and a third element being variably connected to the input shaft and selectively connected to said first or said second element, a second single planetary gearset having a first element being fixedly connected to an element of said first single planetary gearset, a second element being variably connected to a transmission housing, and a third element being fixedly connected to another element of the first single planetary gearset and transferring power to a transfer shaft, a third single planetary gearset having a first element being variably connected to said input shaft, a second element being fixedly connected to second single planetary gearset, and a third element transferring power to the transfer shaft, and a plurality of friction members for the above variable connections.

13 Claims, 3 Drawing Sheets

| Speed Ratio \ Friction Element | C1 | C2 | C3 | B1 | B2 |
|---|---|---|---|---|---|
| D1 | O | | | O | |
| D2 | | O | | O | |
| D3 | O | O | | | |
| D4 | | O | O | | |
| D5 | O | | O | | |
| R1 | | | O | O | |
| R1* | O | | | | O |

GEARTRAIN FOR AN AUTOMATIC TRANSMISSION

BACKGROUND OF THE INVENTION (a) Field of the Invention

The present invention relates to a geartrain, and more specially, to a geartrain for a five forward speeds and one reverse speed automatic transmission, which can be designed to be lightweight and compact in size by combining a clutch, brake, and planetary gearset efficiently.

(b) Description of the Related Art

Generally, an automatic transmission system controls each element of single planetary gearsets which are connected to either operative or inoperative friction elements by a hydraulic control system of a transmission control unit (TCU), so that the automatic transmission system automatically controls shift ratios.

A geartrain is typically described with a combination of planetary gearsets and friction elements to realize shift ratios.

The above described geartrain is variously composed according to shift ratios and the geartrain is composed of primary and sub shifts combining seven clutches and brakes and three single planetary gearsets especially for realizing five forward speeds and one reverse speed.

However, the above described geartrain for an automatic transmission becomes large in size and heavy because of the use of heavy and large-size clutches and brakes and a plurality of inoperative friction elements, which results in power loss.

SUMMARY OF THE INVENTION

The present invention has been made in an effort to solve the above problems associated with the above described conventional geartrain.

It is an object of the present invention to provide a geartrain for an automatic transmission which can be designed to be lightweight and compact in size and improve a power efficiency while realizing a five forward speeds and one reverse speed by three single planetary gearsets and a number of friction elements.

According to a feature of the present invention, a geartrain for an automatic transmission comprises three single planetary gearsets which variably or fixedly connect the specific elements to each other, and a number of friction elements which variably connect a input shaft, each element of said single planetary gearsets, and a transmission housing for outputting five forward speeds and one reverse speed.

More specially, a geartrain for an automatic transmission comprises as follows:

a first single planetary gearset comprising a first element being variably connected to an input shaft, a second element transferring power to a transfer shaft, and a third element being variably connected to the input shaft and selectively connected to said first or said second element;

a second single planetary gearset comprising a first element being fixedly connected to an element of said first single planetary gearset, a second element being variably connected to an transmission housing, and a third element being fixedly connected to another element of the first single planetary gearset and transferring power to an transfer shaft;

a third single planetary gearset comprising a first element being variably connected to said input shaft, a second element being fixedly connected to an element of the second single planetary gearset, and a third element transferring power to the transfer shaft;

a first, second, and third clutch means for variably connecting specific elements of first, second, and third single planetary gearsets to the input shaft or for variably connecting specific elements of first and third single planetary gearsets to each other so that the above described first, second, and third single planetary gearsets being variably and fixedly connected transform an input of the input shaft into five forward speeds and one reverse speed to the transfer shaft; and a first brake means for variably connecting a specific element of the second single planetary gearset to the transmission housing.

As describe above, a geartrain for an automatic transmission of the present invention selectively operates and releases the first, second, and third clutches and the first brake by a hydraulic control system and control the first, second, and third single planetary gearsets for outputting five forward speeds and one reverse speed.

That is, in the forward first speed, the first clutch and the first brake are operated respectively; in the forward second speed, the second clutch and the first brake are operated respectively; in the forward third speed, the first and second clutches are operated respectively; in the forward fourth speed, the second and third clutches are operated respectively; in the forward fifth speed, the first and third clutches are operated respectively; in the reverse first speed, the third clutch and the first brake are operated respectively.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figures 1, 2:
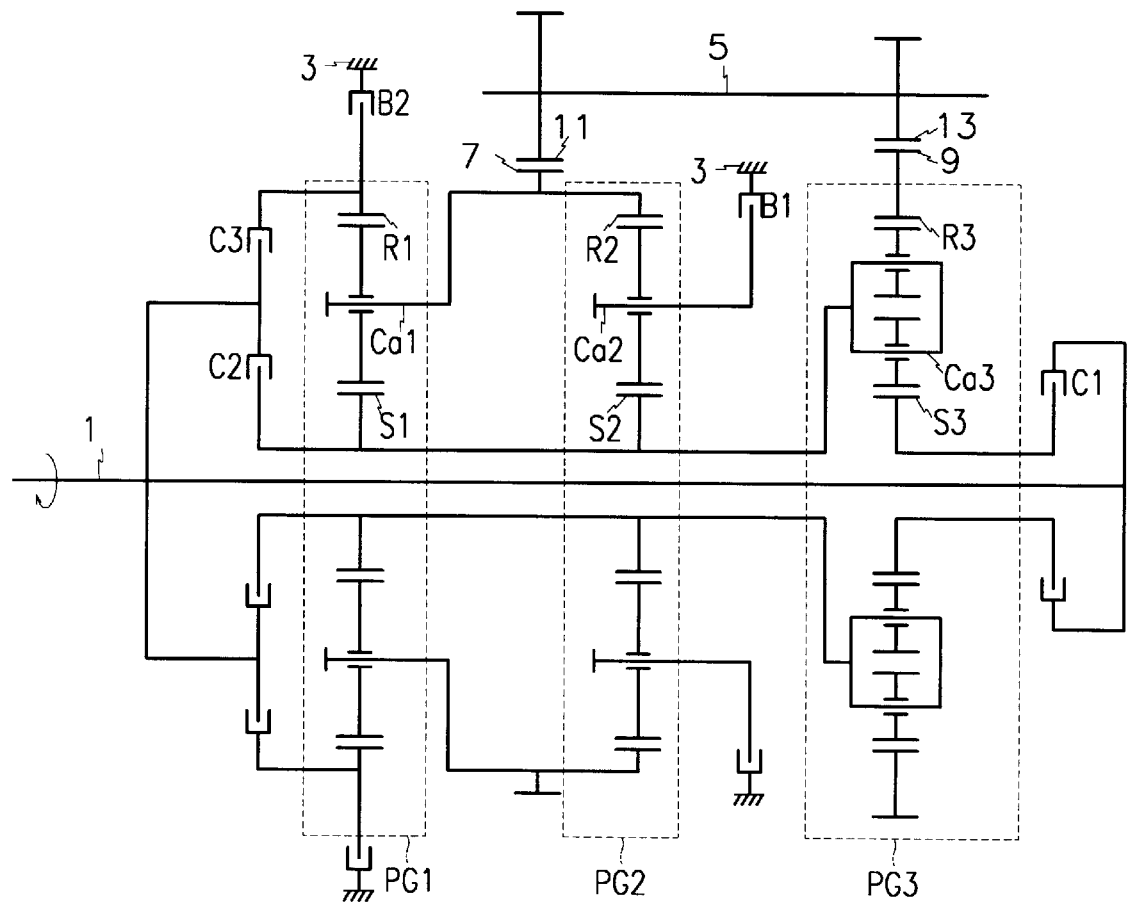
FIG. 1 is a schematic diagram illustrating a geartrain according to a embodiment of the present invention.
FIG. 2 is a chart illustrating the operation of friction element in each shift range of a geartrain for an automatic transmission according to a preferred embodiment of the present invention.
Figure 3:
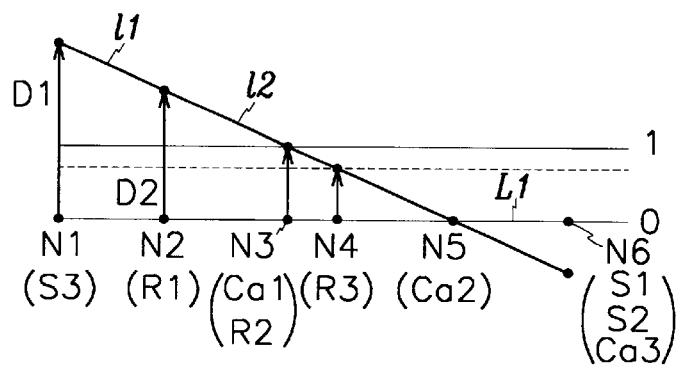
FIG. 3 is a velocity diagram illustrating a shift ratio of forward first and second speeds of a geartrain according to a preferred embodiment of the present invention.
Figure 4:
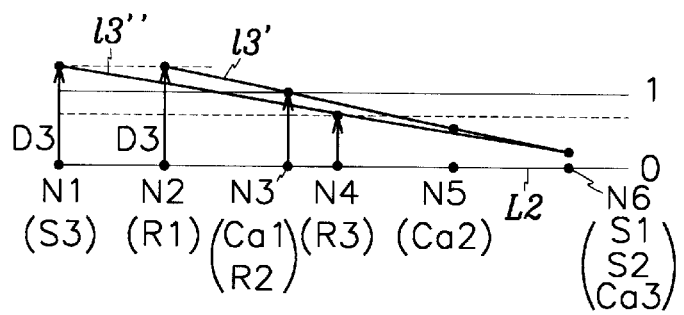
FIG. 4 is a velocity diagram illustrating a shift ratio of forward third speed of a geartrain according to a preferred embodiment of the present invention.
Figure 5:
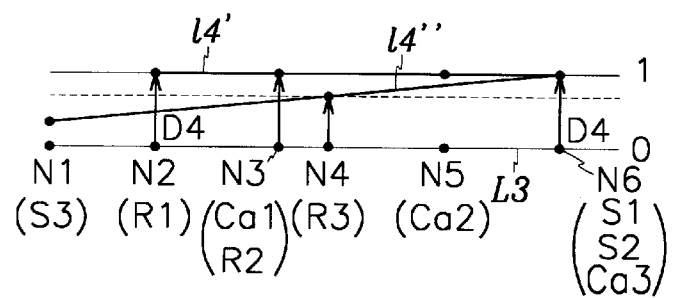
FIG. 5 is a velocity diagram illustrating a shift ratio of forward fourth speed of a geartrain according to a preferred embodiment of the present invention.
Figure 6:
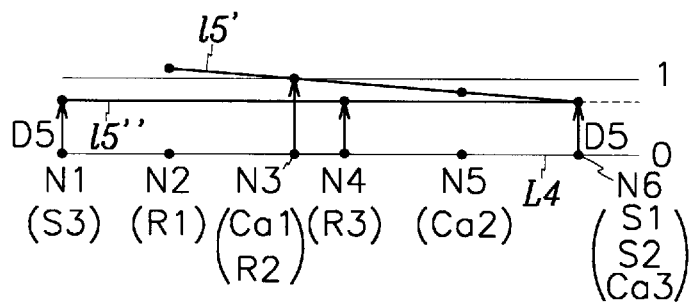
FIG. 6 is a velocity diagram illustrating a shift ratio of forward fifth speed of a geartrain according to a preferred embodiment of the present invention.
Figure 7:
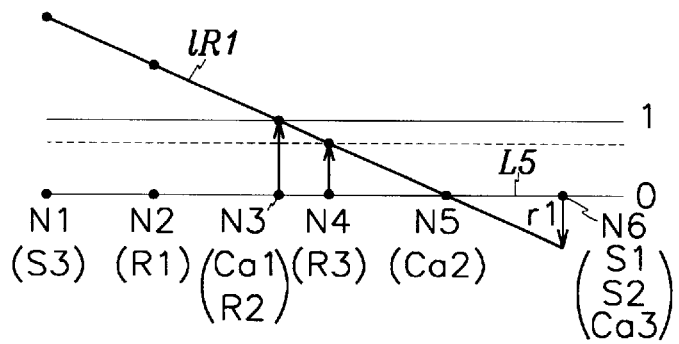
FIG. 7 is a velocity diagram illustrating a shift ratio of reverse first speed of a geartrain according to a preferred embodiment of the present invention.
Figure 8:
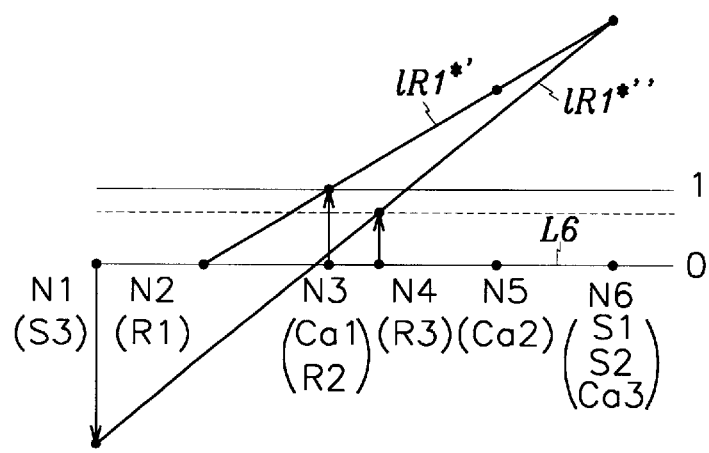
FIG. 8 is a velocity diagram illustrating a shift ratio of reverse first* speed of a geartrain according to a preferred embodiment of the present invention.

Referring to FIG. 1, there is shown a schematic diagram of a geartrain for an automatic transmission.

That is, the geartrain of this embodiment comprises the first, second, and third single planetary gearsets PG1, PG2, and PG3, the first, second, and third clutches C1, C2, and C3 which variably connect the specific elements of the first, second, and third single planetary gearsets PG1, PG2, and PG3 to an input shaft 1, or variably connect the specific elements of the first and third single planetary gearsets PG1 and PG3 to each other, and the first brake B1 which variably connects the specific elements of the second single planetary gearset PG2 to the transmission housing 3.

The above described first single planetary gearset PG1 comprises an element being variably connected to the input shaft 1, an element transferring power to the transfer shaft 5, and an element being variably connected to the input shaft 1 and selectively connected to said first or said second element.

That is, in the first single planetary gearset PG1 which is a single pinion planetary gearset, the sun gear S1 and the ring gear R1 are variably connected to input shaft 1 and variably connect them to each other. The planetary carrier Ca1 is connected to the transfer shaft 5 to transfer power.

Additionally, the second single planetary gearset PG2 comprises an element being fixedly connected to one element of said first single planetary gearset PG1, an element being variably connected to the transmission housing 3, and an element being fixedly connected to another element of first single planetary gearset PG1 and transferring power to the transfer shaft 5.

That is, in the second single planetary gearset PG2 which is a single pinion planetary gearset, the sun gear S2 is fixedly connected to the sun gear S1 of the first single planetary gearset PG1, the planet carrier Ca2 is variably connected to the transmission housing 3, and the ring gear R2 is fixedly connected to the planet carrier Ca1 of the first single planetary gearset PG1 so that the power is transferred to the transfer shaft 5.

Additionally, the third single planetary gearset PG3 comprises an element being variably connected to said input shaft 1, an element being fixedly connected to second single planetary gearset PG2 and an element transferring power to the transfer shaft 5.

That is, in the third single planetary gearset PG3 which is a double pinion planetary gearset, the sun gear S3 is variably connected to the input shaft 1, the planet carrier Ca3 is fixedly connected to the sun gear S2 of the second single planetary gearset PG2, the ring gear R3 is connected to transfer power to the transfer shaft 5.

Furthermore, the first clutch C1 is interposed between the input shaft 1 and the sun gear S3 of the third single planetary gearset PG3 for variably connecting them to each other; the second clutch C2 is interposed between the input shaft 1 and the ring gear R1 of the first single planetary gearset PG1 for variably connecting them to each other; the third clutch C3 is interposed between the input shaft 1 and the sun gear S1 of the first single planetary geatset for variably connecting them to each other.

The first brake B1 is also interposed between the planet carrier Ca2 of the second single planetary gearset PG2 and the transmission housing 3 for variably connecting them to each other.

In addition, in the geartrain of the present embodiment having the second brake B2 to realize the specific reverse first* speed, the second brake B2 is interposed between the ring gear R1 of the first single planetary gearset PG1 and the transmission housing 3 for variably connecting them to each other.

As describe above, the geartrain having the first, second, and third single planetary gearsets PG1, PG2, and PG3 is controlled by the first, second, and third clutches C1, C2, and C3 and the first and second brakes B1 and B2, transfers the output of five forward speeds and one reverse speed to the transfer shaft 5 through planet carrier Ca1 and ring gear R2 of the first and second single planetary gearsets PG1 and PG2, respectively, and ring gear R3 of the third single planetary gearset PG3. Furthermore, the first transfer drive gear 7 (fixedly connected to the planet carrier Ca1 and ring gear R2) and the second transfer drive gear 9 (fixedly connected to the ring gear R3) are themselves connected the first and second transfer gears 11 and 13 in order to connect to the transfer shaft with each constant gear ratio.

Since a transmission control unit (TCU) operates and releases the first, second, and third clutches C1, C2, and C3 and the first and second brakes B1 and B2 selectively according to changes in a running condition of vehicle such as vehicle speed and throttle opening (refer to FIG. 2) the geartrain for an automatic transmission which is comprised as described above realizes five forward speeds and one reverse speed.

That is, in the each forward speed and the reverse speed, since the first, second, and third clutches C1, C2, and C3 and the first and second brakes B1 and B2 are operated and released as shown in FIG. 2, the first, second, and third single planetary gearsets PG1, PG2, and PG3 are represented by the first, second, third, fourth, fifth, and sixth levers L1, L2, L3, L4, L5, and L6 as shown in FIG.3, FIG. 4, FIG. 5, FIG. 6, FIG. 7, and FIG. 8.

The first, second, third, fourth, fifth, and sixth levers L1, L2, L3, L4, L5, and L6 are represented by the first, second, third, fourth, fifth, and sixth nodes N1, N2, N3, N4, N5, and N6 indicating each element of the first, second, and third single planetary gearsets PG1, PG2, and PG3.

That is, the first node N1 indicates the sun gear S3 of the third single planetary gearset PG3, the second node N2 indicates the ring gear R1 of the first single planetary gearset PG1, the third node N3 indicates the combination of the planetary carrier Ca1 and the ring gear R2 of the first and second single planetary gearsets PG1 and PG2, the fifth node N5 indicates the planet carrier Ca2 of the second single planetary gearset PG2, and the sixth node N6 indicates the combination of the sun gears S1 and S2 of the first and second single planetary gearsets PG1 and PG2 as well as the planet carrier Ca3 of the third single planetary gearset PG3.

Therefore, when explaining the operation states in each shift range, the following explanation is carried out by indicating each node instead of each element of the first, second, and third single planetary gearsets PG1, PG2, and PG3.

Forward First Speed

In the forward first speed, since the first clutch C1 and the first brake B1 are operated, in the first lever L1 (refer to FIG. 3) the third and fourth nodes N3 and N4 become the output element, the fifth node N5 becomes the reacting element, and the first node N1 becomes the input element. At this point, the output of the third node N3 is assumed to be "1," and the output of the fourth node N4 is assumed to have a constant ratio less than that of the third node N3. This determines the gear ratio of the first and second transfer drive gears 7 and 9, and the first and second transfer driven gears 11 and 13.

Therefore, a line connecting the point of the fifth node N5 acting as the reacting element and the point at "1" of the third node N3 and the point having the constant ratio of the fourth node N4 and the optional points of the first, second, and sixth nodes N1, N2, and N6 becomes the first speed line I1. Here, the magnitude (indicated by a vertical line in FIG. 3) at the first node N1 acting as the input element becomes the input speed ratio of the forward first speed D1 to output "1".

That is, this shows that output of the forward first speed is reduced for an input speed ratio D1 of the forward first speed.

Forward Second Speed

When vehicle speed and throttle opening conditions reach the state for changing from the same forward first speed as in the above described condition to a second speed state, the transmission control unit (TCU) activates the second speed control.

That is, in the second speed state, since the first clutch C1 is released and the second clutch C2 is operated while the first brake B1 is operated (refer to FIG. 3), the only input element changes into the second node N2 in the first lever L1.

Therefore, a line connecting the point of the fifth node N5 acting as the reacting element and the point indicating "1" of the third node N3 and the point having the constant ratio of the fourth node N4 and the optional points of the first, second, and sixth node N1, N2, and N6 becomes the second speed line I2. Here, the magnitude (indicated by a vertical line in FIG. 3) at the second node N2 acting as the input element becomes the input speed ratio of the forward second speed D2 to output "1."

That is, in the forward second speed, when using the same output as in the forward first speed, the input speed ratio of the forward second speed D2 is less than the input speed ratio of the forward first speed D1, and the speed in the forward second speed becomes greater than that of the forward first speed. It also shows that output of the forward second speed is reduced.

Forward Third Speed

When vehicle speed and throttle opening conditions reach the state for changing from the same forward second speed as in the above described condition to forward third speed, the transmission control unit (TCU) activates the third speed control.

That is, in the third speed state, since the first brake B1 is released and the first clutch C1 is operated while the second clutch C2 is operated (refer to FIG. 4), the third and fourth nodes N3 and N4 become the output element, and the first and second nodes N1 and N2 become the input element in the second lever L2.

Accordingly, a line connecting the point greater than "1" of the second node N2 and the point at "1" of the third node N3 and the optional points of the fifth and sixth nodes N5 and N6 becomes the first third-speed line I3'. Additionally, a line connecting the point of the first node N1 having the same magnitude as the second node N2, and the above described point of the fourth node N4 and the optional point of the sixth node N6 becomes the second third-speed line I3". Here, the sixth node N6 becomes the constraint element. Therefore, the magnitude (indicated by a vertical line in FIG. 4) at the first and second nodes N1 and N2 acting as the input element becomes the input speed ratio of the forward third speed D3.

That is, in the forward third speed, when using the same output as in the forward second speed, the input speed ratio of the forward third speed D3 is less than the input speed ratio of the forward second speed D2, the speed in the forward third speed becomes greater than that of the forward second speed. It also shows that output of the forward third speed is reduced.

Forward Fourth Speed

When vehicle speed and throttle opening reach the states for changing from the same forward third speed as the above described condition to fourth speed state, the transmission control unit (TCU) activates the fourth speed control.

That is, in the fourth speed state, since the third clutch C3 is operated and the first clutch C1 is released while the second clutch C2 is operated (refer to FIG. 5), the third and fourth nodes N3 and N4 become the output element, and the second and sixth nodes N2 and N6 become the input element in the third lever L3.

Accordingly, a line connecting the point indicating "1" of the third node N3 and the point indicating "1" of the second and sixth nodes N2 and N6 having the same magnitude, and the point of the fifth node N5 having the same magnitude becomes the first fourth-speed line I4'. Additionally, a line connecting the above described point of the sixth node N6 indicating "1" and acting as the reacting element and the optional point of the first node N1 becomes the second fourth-speed line I4". Here, the magnitude of a vertically drawn line in FIG. 5 at the second and sixth nodes N2 and N6 acting as the input element becomes the input speed ratio of the forward fourth speed D4.

That is, in the forward fourth speed, when using the same output as in the forward third speed, the input speed ratio of the forward fourth speed D4 is less than the input speed ratio of the forward third speed D3, the speed in the forward fourth speed becomes greater than that of the forward third speed. It also shows that output of the forward fourth speed is constant.

Forward Fifth Speed

When vehicle speed and throttle opening conditions reach the state for changing from the same forward fourth speed as the above described condition to fifth speed state, the transmission control unit (TCU) activates the fifth speed control.

That is, in the fifth speed state, since the first clutch C1 is operated and the second clutch C2 is released while the third clutch C3 is operated (refer to FIG. 6), the third and fourth nodes N3 and N4 become the output element, and the first and sixth nodes N1 and N6 become the input element in the fourth lever L4.

Accordingly, a line connecting the point less than "1" of the sixth node N6 acting as the reacting element and the point at "1" of the third node N3 and the optional points of the second and fifth nodes N2 and N5 becomes the first fifth-speed line I5'. Additionally, a line connecting the above described point of the sixth node N6 and the point of the first and fourth nodes N1 and N4 becomes the second fourth-speed line I5". Here, the magnitude (indicated by vertical lines in FIG. 6) at the first and sixth nodes N1 and N6 acting as the input element becomes the input speed ratio of the forward fifth speed D5.

That is, in the forward fifth speed, when using the same output as in the forward fourth speed, the input speed ratio of the forward fifth speed D5 is less than the input speed ratio of the forward fourth speed D4, the speed in the forward fifth speed becomes greater than that of the forward fourth speed. It also shows that output of the forward fifth speed is increased.

Reverse First Speed

In the reverse first speed state, since the third clutch C3 and the first brake B1 are operated (refer to FIG. 7), the third and fourth nodes N3 and N4 become the output element, the fifth node N5 becomes the reacting element, and the sixth node N6 becomes the input element in the fifth lever L5.

Accordingly, a line connecting the point of the fifth node N5 acting as the reacting element and the point at "1" of the third node N3, acting as the output element and the above described point of the fourth node N4 and the optional points of the first, second, and sixth nodes N1, N2, and N6 becomes the reverse first speed line IR1. Here, the magnitude (indicated by a vertical line in FIG. 7) at the sixth node N6 acting as the input element is a input speed ratio of the reverse first speed r1 to the output "1". Additionally, since the output "1" is assumed to be in the upward direction, the input speed ratio of the reverse first speed r1 is represented by an arrow in the downward direction in the fifth lever L5.

That is, this indicates that the output in the reverse first speed has an inverted direction to the input rotational direction.

Reverse First* Speed

In the meantime, in the reverse first* speed state, since the first clutch C1 and the second brake B2 are operated (refer to FIG. 8), the third and fourth nodes N3 and N4 become the output element, the second node N2 becomes the reacting element, the sixth node N6 becomes the constraint element, and the first node N1 becomes the input element in the sixth lever L6.

Accordingly, a line connecting the point of the second node N2 acting as the reacting element and the point at "1" of the third node N3 acting as the output element and the optional points of the fifth and sixth nodes N5 and N6 becomes the first reverse first*-speed line IR1*'. Additionally, a line connecting the above described point of the sixth node N6 acting as the constraint element and the optional point of the first node N1 acting as the input element, becomes the second reverse first*-speed line IR1*".

Here, the magnitude of vertical direction in the sixth node N6 acting as the input element is a input speed ratio of the reverse first* speed r1* to the output "1". Additionally, since the output "1" is assumed to be in the upward direction, the input speed ratio of the reverse first* speed r1* is represented by an arrow in the downward direction in the fifth lever L5.

That is, it shows that the output in the reverse first* speed has an inverted direction to the input rotational direction.

As described above, the present invention relates to a geartrain for five forward speeds and one reverse speed automatic transmission, which combines three single planetary gearsets, three clutches, and one or two brakes efficiently, and operates and releases clutches and brakes.

In addition, the above described geartrain is designed to be lightweight and compact in size by reducing the number of clutches and brakes, and is designed to increase a power efficiency by reducing the inoperative friction element.

What is claimed is:

1. A geartrain for an automatic transmission comprising:
   a first single planetary gearset comprising a first element variably connected to an input shaft, a second element transferring power to a transfer shaft, and a third element variably connected to the input shaft and selectively connected to said first element;
   a second single planetary gearset comprising a first element fixedly connected to one of said first, second, or third elements of said first single planetary gearset, a second element variably connected to a transmission housing, and a third element fixedly connected to another of said first, second or third, elements of the first single planetary gearset and transferring power to the transfer shaft;
   a third single planetary gearset comprising a first element variably connected to said input shaft, a second element fixedly connected to one of said first, second, or third elements of said second single planetary gearset, and a third element transferring power to the transfer shaft;
   a first, second, and third clutch means for variably connecting one of said first, second, or third elements of said first, second, and third single planetary gearsets to the input shaft or for variably connecting any of said first, second, or third elements of said first and third single planetary gearsets to each other so that the first, second, and third single planetary gears are variably and fixedly connected to selectively transform an input of the input shaft into five forward speeds and one reverse speed to the transfer shaft;
   a first brake means variably connecting one of said first, second, or third elements of the second single planetary gearset to the transmission housing; and
   a second brake means interposed between the third element of said first single planetary gearset and the transmission housing.

2. A geartrain of claim 1, wherein said first single planetary gearset is a single pinion planetary gearset.

3. A geartrain of claim 1 or claim 2, wherein said first element of said first single planetary gearset is a sun gear and said third element of said first single planetary gearset is a ring gear, and said sun gear and said ring gear are variably connected to the input shaft and variably connected to each other, and said second element of said first planetary gearset is a planet carrier.

4. A geartrain of claim 1, wherein said second single planetary gearset is a single pinion planetary gearset.

5. A geartrain of claim 1 or 4, wherein said first element of said second single planetary gearset is a sun gear fixedly connected to the first element of said first single planetary gearset, said second element of said first planetary gearset is a planet carrier, and said third element of said second planetary gearset is a ring gear fixedly connected to the second element of said first single planetary gearset.

6. A geartrain of claim 1, wherein said third single planetary gearset is a double pinion planetary gearset.

7. A geartrain of claim 1 or claim 6, wherein said first element of said third single planetary gearset is a sun gear, said second element of said third single planetary gearset is a planet carrier fixedly connected to said first element of said second single planetary gearset, and said third element of said third single planetary gearset is a ring gear.

8. A geartrain of claim 1, wherein the fist clutch means is interposed between the input shaft and the first element of said third single planetary gearset.

9. A geartrain of claim 1, wherein the second clutch means is interposed between the input shaft and the third element of said first single planetary gearset.

10. A geartrain of claim 1, wherein the third clutch means is interposed between the input shaft and the first element of said first single planetary gearset.

11. A geartrain of claim 1, wherein the first brake means is interposed between the second element of said second single planetary gearset and the transmission housing.

12. A geartrain of claim 1, wherein the first and second brake means are selectively operated according to a reverse shift control.

13. A geartrain of claim 1, wherein the second element and the third element of the first and second single planetary gearsets respectively are fixedly connected to a first transfer drive gear, the third element of the third planetary gearset is fixedly connected to a second transfer drive gear, and the transfer shaft is fixedly connected to first and second transfer driven gears engaged with said first and second transfer drive gears respectively to transfer power at a constant gear ratio from each of said first, second, and third single planetary gearsets to the transfer shaft.

* * * * *

UNITED STATES PATENT AND TRADEMARK OFFICE
CERTIFICATE OF CORRECTION

PATENT NO.    : 6,287,234 B1
DATED         : September 11, 2001
INVENTOR(S)   : Jong-Sool Park It is certified that error appears in the above-identified patent and that said Letters Patent is hereby corrected as shown below:

<u>Title page,</u>
Item [73], change "Hyndai" to -- Hyundai --

<u>Column 8, claim 8,</u>
Line 53, change "fist" to -- first --.

Signed and Sealed this

Twenty-sixth Day of March, 2002

Attest:

JAMES E. ROGAN
Attesting Officer    Director of the United States Patent and Trademark Office